July 1, 1924.

G. H. FRASER

FLUID CURRENT SEPARATOR

Original Filed May 21, 1915     4 Sheets-Sheet 1

INVENTOR

George Holt Fraser

July 1, 1924.

G. H. FRASER

FLUID CURRENT SEPARATOR

Original Filed May 21, 1915   4 Sheets-Sheet 3

1,499,724

INVENTOR

George Holt Fraser

Patented July 1, 1924.

1,499,724

UNITED STATES PATENT OFFICE.

GEORGE HOLT FRASER, OF BROOKLYN, NEW YORK.

FLUID-CURRENT SEPARATOR.

Continuation of application Serial No. 29,705, filed May 21, 1915. This application filed October 26, 1921.
Serial No. 510,585. Renewed December 4, 1923.

*To all whom it may concern:*

Be it known that I, GEORGE HOLT FRASER, a citizen of the United States, residing in the borough of Brooklyn, county of Kings, city and State of New York, have invented certain new and useful Improvements in Fluid-Current Separators, being a continuation of my original application filed May 21, 1915, Serial Number 29,705, renewed April 6, 1921, renewal Serial Number 459,017, of which the following is a specification.

This invention relates to separators for extracting solids from fluid currents, and aims to provide improvements therein.

Air separators for extracting floating dust from air belong to this class, and usually comprise a rotary or other distributor for finely divided material, a casing comprising feed and dust chambers, means for causing a fluid current to traverse the descending material from the feed to the dust chamber for floating out and separating the fine dust, and suitable outlets.

My invention aims to provide for a better separation of the finer material, selection or grading of the products, compactness and convenience in construction, and better current regulation, in such devices.

To this end in carrying out the preferred embodiment of my present improvements I provide an improved distributor, an improved selector beyond the distributor, a precipitating chamber beyond the selector, a filter or fine dust extractor succeeding the precipitating and selecting chambers, a current conduit or passage in which said parts are successively disposed, means for causing a fluid current to flow through said passage, means for adjusting such current, and separate coarse and fine outlets for the different grades of material.

These improvements may be embodied in either a direct or a radiating current separator, and in one having either an inside or an outside fan or blower for producing the current, but in the preferred form of my invention I provide an improved construction for utilizing an outside blower, and means for introducing a current to and withdrawing it from the main casing tangentially or in whirling or cyclonic condition so that its centrifugal force can be utilized to equalize the current and avoid short circuits or excessive current speeds at any point, all as will be hereinafter more fully set forth.

In the accompanying drawings, which illustrate certain adaptations of my improvements as applied to air separators.

Referring to the drawings let A indicate the main frame or casing of an air separator, B the feed inlet, C the feeder, D the distributor, E the feed chamber, F the dust chamber, G the coarse outlet, H the fine outlet, I the fan or blower, and J the driving mechanism.

These parts may be of any usual or suitable construction which will serve to distribute finely divided material and cause a fluid current to flow through the material as it descends so as to permit the fines to be floated into the dust chamber while the tailings fall through the feed chamber. The casing is usually a sheet metal cylinder enclosing the necessary cones, walls, and pipes to provide suitable conduits, passages and chambers for the currents and products desired. The inlet usually comprises a hopper for connection with a source of supply of pulverulent material. The feeder is generally a revolving disc. The distributor usually comprises means for causing the material to descend in a thin wide stream in the feed chamber. The blower is usually situated inside or outside of the casing connected to cause a current to flow from the feed chamber through the descending material and into the dust chamber in an endless circuit. The fine outlet receives and discharges material precipitated in the dust chamber.

Figures 1, 2:
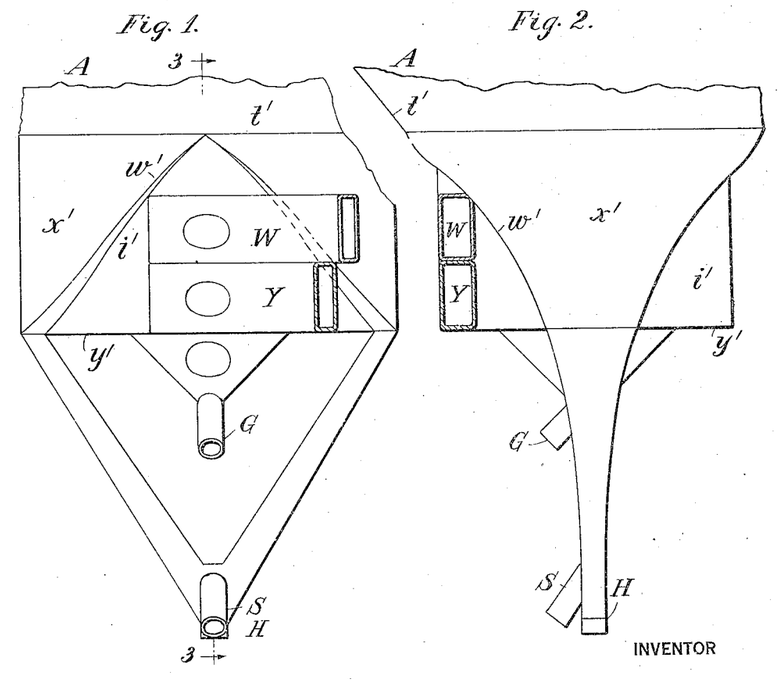
Figs. 1 and 2 are side elevations of the lower portion of the preferred form of my improved separator.
Figure 3:
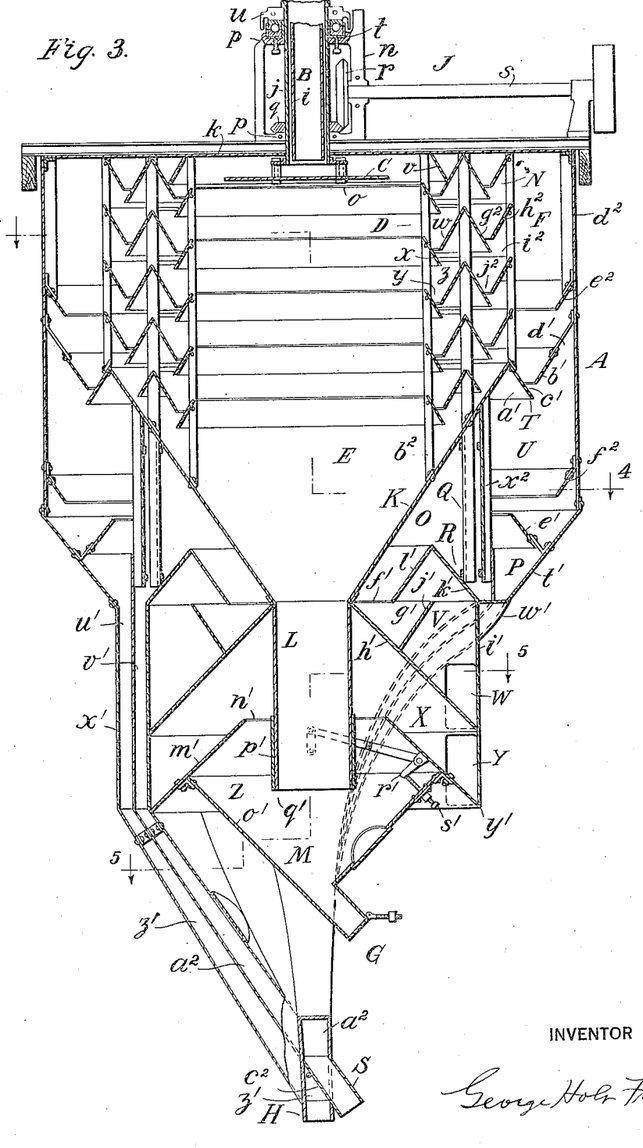
Fig. 3 is a vertical axial section of an outside blower separator showing the preferred form of my improvements, the view being cut approximately on the lines 3—3 in Figs. 1, 4 and 5 and looking in the direction of the arrow.
Figure 4:
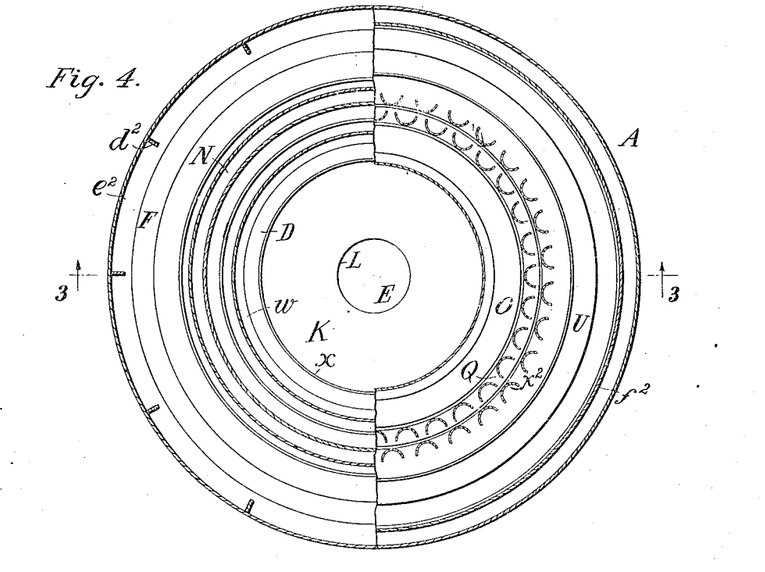
Fig. 4 is a horizontal section thereof cut on the planes of the lines 4—4 in Fig. 3 and looking in the direction of the arrow.
Figure 5:
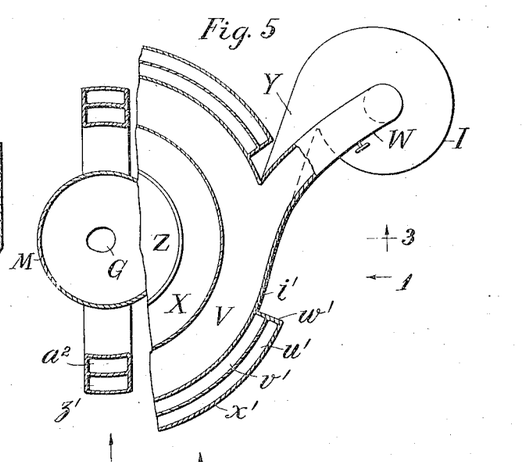
Fig. 5 is a horizontal section thereof cut on the planes of the lines 5—5 in Fig. 3 and looking in the direction of the arrow.

Referring to Figs. 1, 2 and 3 I will now describe in detail the preferred adaptation of my improvements as shown therein as applied to an outside blower.

Figure 6:
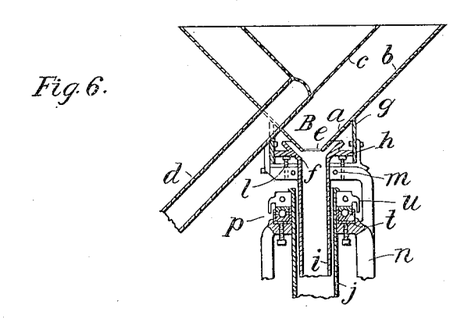
Fig. 6 is a fragmentary vertical axial section of the top of the separator shown in Fig. 1, cut on the same line, and showing the top of the feed pipe, bearing frame, and feed hopper with my improved scalper and tailings pipe therein.

According to one feature of improvement, as shown in Fig. 6, the inlet B is provided with a stationary hopper $a$ having a conical or tapering bin $b$ protected by a conical or tapering scalper $c$ having a central coarse outlet $d$ for taking oversize from the bin and a central fine outlet $e$ for feeding the separator, which hopper is adapted to make suitable contact with an adjustable feed hopper $f$ as by having a hollow or cylindrical wall $g$ making sliding contact with a reciprocal wall $h$ of the latter to prevent dust leakage between these. The feed hopper $f$ has a feed pipe $i$ opposite the opening $e$ and extending axially of the separator through the tubular drive shaft $j$ and top wall $k$ thereof into the feed chamber E, and opening opposite the feeder disc C, toward and from which it is adjustable to control speed of flow by screws $l$. It slides in a guideway $m$, which is divided so that it can be clamped in position when set and can be easily loosened for adjustment or freed for removal.

Feed to the hopper $b$ may come from any direction, and it may turn to direct its coarse spout $d$ to either side. It is removably mounted on the driving frame or bracket $n$ which supports the feed pipe, feeder and driving mechanism.

The feeder C is an adjustable revolving disc carried by bolts $o$ from the flanged lower end of the tubular shaft $j$ within the chamber E, which shaft extends upwardly upon the feed pipe I and has upper and lower bearings $p$ for guiding and supporting it, intermediate of which it is driven, as by a bevelled gear $q$ keyed to the shaft and meshing with a bevelled gear $r$ on the shaft $s$.

The bracket $n$ is open-sided and has split bearings, so that the driving shaft can be removed. The bearings $p$ preferably comprise a U-shaped or grooved cupped ring $t$ removably and adjustably seated in the bracket $n$ and containing balls and races which run in oil in the cupped ring, which is high enough to preserve the desired oil level, and constructed to make a dust joint with the tubular shaft and its gear at the lower bearing and with this shaft and its supporting collar $u$ at the upper bearing.

The distributor D preferably consists of a series of inclined members adapted to receive material from the feeder and cause it to fall in a wide thin stream. When the material is to surround the feed chamber the distributor members are annular rings, and when its speed of descent is to be controlled these comprise alternately reversely inclined spaced rings which will intercept, distribute, collect and again distribute the material as it descends so as to cause it to follow a zig-zag downward course and retard it so that it will form a slowly descending wall or envelope surrounding the feed chamber. As shown the distributor comprises an impact baffle ring $v$, outer converging or receiving rings $w$, and inner retarding and distributing rings or dams $x$ arranged concentrically and forming a substantially cylindrical cage or distributor having narrow feeding passages $y$ between the rings $w$ and $x$, and wide air passages $z$ between successive pairs of these rings, so that the material will fall from step to step and the air current will flow out between each step in a series of upwardly inclined but substantially horizontal flowing streams isolated by the respective rings, and will thereby float out with it all material fine enough to be carried by the current toward the dust chamber.

I preferably provide a selector N, of inner rings or plates $g^2$ and outer spaced rings or plates $h^2$, affording between them sinuous current passages $i^2$ and outlets $j^2$, beyond the distributor.

Tailings from the distributor will fall onto the tailings cone K and descend through its discharge pipe L to the coarse cone M, with those from the selector N.

The dust and air will descend from the dust chamber F, and the air will flow through the return passage O which is in communication through the suction and blast chambers with the pipe L so that the current may circulate continuously through these and the dust and feed chambers to provide an endless circuit so that the air may be used over and over. Dust coarse enough to precipitate in the dust chamber will fall in the dust cone P and flow to the outlet H.

One feature of my improvements provides for making a separation of the fine material reaching the dust chamber to an excessively fine product, as well as extracting all of the floating material from the current, and this I preferably accomplish by providing filtering or extracting means Q between the dust chamber and the return passage O, and a supplemental or intermediate collector or extraction chamber R for the product extracted, and a separate extraction outlet S therefor. The filter Q is preferably a pervious or foraminous construction, and is shown as plurality of rows of vertically arranged hollow sided troughs or tubes, one row within the other, and disposed so that the hollow face of a trough of the inner row is opposite the space between adjacent edges of two outer troughs, so that current passing between these will form voids, air cones or dead spaces opposite their faces, in which flowing material may settle and descend to the chamber R without danger of being again taken up by the current.

These tubes are preferably vertical or slightly inclined outwardly at their lower ends so that material descending therein may slide down them instead of falling outwardly into the current. The tubes extend from the underside of the wall K to or into the chamber R so as to guide their precipitates past any existing current and deposit them in the calm within this chamber. They constitute a foraminous wall separating the dust chamber from the return chamber, and will be adapted to extract particles of the fineness desired from the return current or to clean the return air, and the proportioning and location of adjacent parts will be adapted to permit precipitation of lumps of predetermined coarseness outside of the filter so that the extraction in the latter will be only of the fineness desired. As shown in the construction in Fig. 3 the extraction chamber has an outer wall rising above the bottom of the dust chamber to provide a pocket or guard at the lower part of the latter for protection against ingress of coarse particles, and the filter is surrounded by guards or bevels $e'$ to prevent inbounding of coarse pieces.

My invention preferably provides for sub-dividing the dust chamber and downwardly directing its solid contents in an annular blanket and its fluid contents in an annular current outwardly thereof. This is preferably accomplished by a divider or dam T which is shown as an outwardly inclined ring or plate $a'$ and a reversely inclined ring or plate $b'$ spaced apart to their adjacent edges sufficiently to provide a dust passage $c'$ for directing outwardly the dust in the chamber F into the precipitating chamber U. The ring $a'$ is opposite the wall K, and directs the dust outwardly therefrom, while the ring $b'$ is spaced apart from the casing A to provide between its outer side and the casing an annular current passage $d'$ down which the air from the chamber can flow freely, so as to bring the air at the outer side of the descending dust. Below the divider this outer air flows slowly inwardly toward the filter Q, thus giving it a reverse inward action to float particles of the desired fineness into the filter while permitting larger material to precipitate. Whirl checks $d^2$, dust guards $e^2$, and air chutes $f^2$ are provided.

According to another feature of my invention I provide an outside blower as the current producing means, and means for connecting the suction side of this blower with the return chamber or passage O inwardly of the dust, precipitation and extraction chambers, and means for centrifugally or tangentially exhausting the air so that a cyclonic effect to equalize its action may be utilized. This is preferably accomplished as shown in Figs. 1, 2 and 3, by providing an annular exhaust chamber V inwardly of the precipitation and extraction chambers, surrounding the tailings pipe L, and beneath and outwardly of the outlet opening of the return passage O, from which chamber the suction pipe W leads tangentially, so that the exhausted current will be whirled in the chamber V, producing a uniform rarefaction around the outlet $f'$ of the passage O, through which the outflow will uniformly pass through a sinuous passage $g'$ to the suction chamber V. As shown the inclined bottom wall $h'$ of this chamber extends from its cylindrical front wall $i'$ to the cone or wall K, and carries an annular dam $j'$ extending outwardly toward the inclined inner wall $k'$ of the extraction chamber, so as to leave a narrow space under the latter, which is interrupted by an annular reverse cone or wall $l'$ constituting the bottom wall of the chamber O.

My invention comprises means for availing of similar conditions to those described for introducing the current from an outside blower. These preferably consist of an annular blast chamber under the suction chamber V and into which the pressure pipe Y of the blower discharges tangentially so as to cause the blast to whirl therein and equalize itself before flowing over the lower wall $m'$ of this chamber through its central outlet $n'$ into the compression chamber Z from which it overflows under the lower end of the pipe L into the feed chamber E. The bottom wall $c'$ of the chamber Z extends from the wall $n'$ downwardly and ends in or forms part of the tailings outlet G, which is usually closed with an automatic or guard valve to prevent current outflow.

By these provisions the exhaust and pressure currents can be provided with the minimum of irregularity and short circuits will be avoided, so that the currents may operate uniformly and avoid variations in product. The various extractions will flow down outside of the current chambers, and the coarse tailings pass centrally through them, the incoming air rising through the falling tailings.

My invention provides improved means for regulating the current, preferably consisting in a valve $p'$ on the outlet L and adapted to be raised or lowered to diminish the air passage $e'$ under this pipe, thus avoiding disturbance of relation of any of the other parts while permitting suitable current regulation. The valve $p'$ is shown as adjusted by a lever $r'$ operated by a rod $s'$.

According to another feature of improvement the several internal conduits are exposed or directly accessible from the outside. As shown the bottom $t'$ of the cylindrical dust chamber is conical, and the outlets from the precipitation chamber U and the extraction chamber R constitute annular cylindrical or tubular portions $u'$ $v'$ respectively of sufficient height to include the exhaust and pressure pipes and permit an inclined wall bottom $w'$ for these cylindrical portions of suitable inclination to be steeper than the angle of flow of material from these chambers, between which inclined walls the outer walls of the chamber U and P are cut away or omitted so as to expose the cylindrical outer wall $x'$ of the suction and blast chambers V and X, so that the pipes W and Y can be directly tangentially connected to these. The inclined walls $w'$ of the chambers U and R are substantially spiral and wind around the chambers V and X to the lower edge $v'$ thereof, and the cutaway parts of the cylindrical walls permit access beneath this edge, and expose under it the spout and conical wall $o'$ of the pressure chamber M, which is detachably mounted on and can be removed from the other parts to give access within the separator.

The dust and extraction passages continue downwardly from the bottom of the edge $v'$ as sections of cones on inwardly inclined tubular passageway $z'$ and $a^2$ respectively until meeting their respective outlet spouts R and S.

The several parts are suitably supported, the distributor rings being supported from their remote edges by posts $b^2$ to permit an uninterrupted annular space between their adjacent edges.

In operation the feeder and blower may be connected to drive together at any relative speed, or operated independently. The speed of feed will be adjusted by adjusting the secondary hopper, and speed of current by adjusting the fan or the usual butterfly valves or the valve $P'$. Products of the desired grades being arrived at the separator will continue uniform work without subsequent adjustment. Intermixing of products or their isolation will be resorted to by opening or closing the valve $c^2$, which will be opened when the filter is merely used to insure cleaning all dust from the returning air, and will be closed when the extracted product is to be used separately from that precipitated in the chamber U.

It will be seen that my invention provides improvements which can be readily and advantageously availed of in whole or in part, and it will be understood that the invention is not limited to the particular details of construction, arrangement and combination of parts set forth as constituting its preferred embodiment, since it can be used in whole or in part according to such modifications of these as circumstances or the judgment of those skilled in the art may dictate, without departing from the spirit of the invention.

Figure 7:
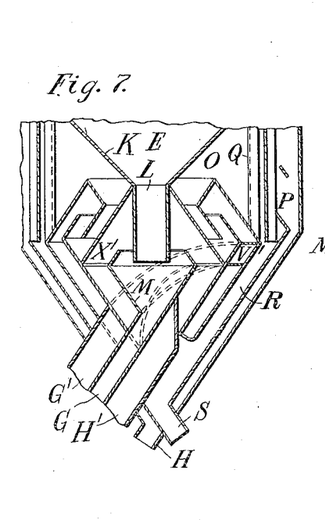
Fig. 7 is a vertical axial section showing a modification of my improvements in outside blower type separators.

One such modification is shown in Fig. 7 in which the exhaust pipe $G'$ and blast pipe $H'$ enter their chambers from below diagonally upwardly spirally so as to whirl the current in their respective cones as they communicate with the suction chamber $V'$ and blast chamber $X'$, the cylindrical intermediate portion of the separator here being eliminated, and the conical extremities, outlets for the several cones, and passageways requisite to the connections and conductions, being smooth. This form is adapted to vertical compactness and simplicity but does not permit taking as complete advantage of centrifugal utilization for cyclonic current effects as does the more complete form described.

Figure 8:
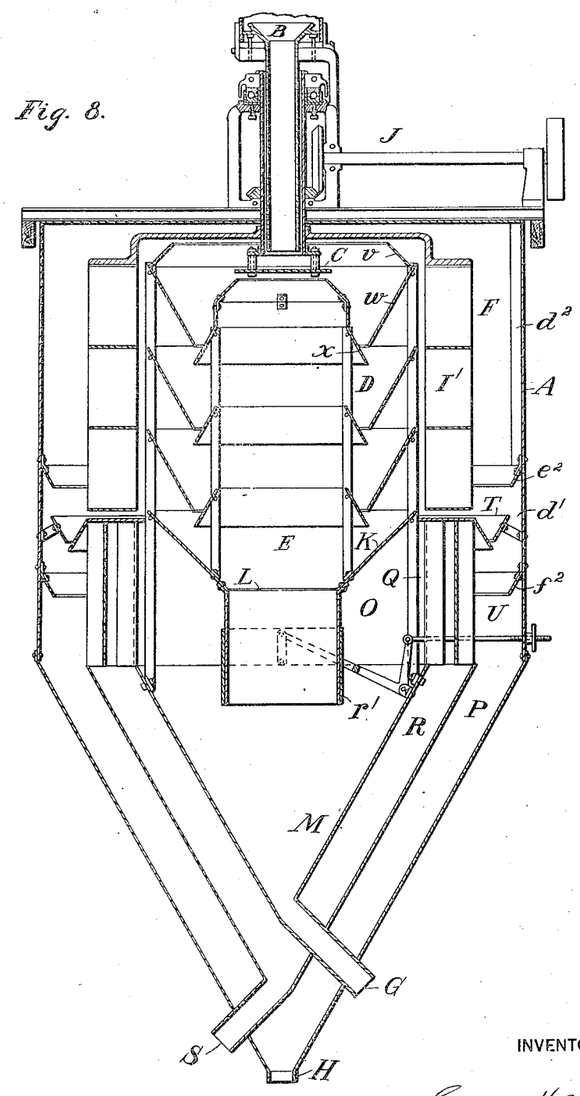
Fig. 8 is an axial section showing a modification as applied to an inside blower type of separator.

Another modification is shown in Fig. 8, in which my improvements are utilized with an inside blower, the fan $I'$ surrounding the distributor inwardly of the dust chamber, and the valve $p'$ permitting the coarse cone M to be fixed relatively to the filter Q.

My improved selector N is used between the distributor and the dust chamber for extracting large pieces from the current before reaching the latter when it is desired that nothing exceeding a predetermined size shall enter the dust chamber, as when product of the precipitating chamber is to be used as a separate product coarser than that of the extracting chamber but not having pieces coarser than those that will pass the selector. The inner selector plates $q^2$ are preferably annular outwardly and downwardly inclined rings, and the outer selector plates $h^2$ are preferably annular upwardly inclined rings spaced sufficiently apart from the plates $q^2$ to provide narrow annular outlets $j^2$ for the larger particles selected out of the current, so that these may descend across the current passages $i^2$ and fall onto the wall K, down which they will slide and mingle with the coarse tailings passing out through the discharge pipe L unless they are to constitute a separate product, in which case a supplemental tailings cone and conduit will be mounted above the cone K, so as to provide a separate outlet for this intermediate granular selection. The selector N may be omitted when its function or product results are not desired.

It will be noted that the current passages through the distributor and selector constitute undulating horizontal and upwardly progressing sinuous conduits in which the direction of outflow of the current is successively changed so that precipitation of large particles is facilitated: also that the parts are proportioned to insure a careful diminution of current speed that the final speed of flow shall be that suited to floating the maximum size it is desired to carry into the dust chamber.

To prevent centrifugal or whirling currents in the dust chamber and aid in extracting floating dust therein vertical whirl checks $d^2$ are preferably provided on its outer wall as shown, and to project dust descending on this wall into the trough of the divider dust guards or deflectors $e^2$ are fastened on this wall sufficiently above the air passage to permit current to flow underneath them around the divider T, and sufficiently close to the latter to project descending dust through this current into the trough.

Below the divider for operating inwardly the external current air chutes or deflectors $f^2$ are preferably provided on the inner wall, so that this descending current will first go outwardly around the divider and then be converged inwardly toward the descending stream or envelope of dust to float the finest thereof toward the filter or return chamber. These parts may be fixed or adjustable and multiplied to suit circumstances.

For the purpose of more completely disclosing the scope and applicability of the features incident to this invention which I prefer to claim in this application many features of improvement in separators and similar apparatus are herein shown and set forth but not specifically claimed in this application, being the subject matter of claims in my applications, Serial Numbers 858,797 filed August 27, 1914, renewal number 267,401, filed December 18, 1918; 859,004 filed August 28, 1914, renewal number 267,-402 filed December 18, 1918; 69024 filed December 28, 1915; 69025 filed December 28, 1915; and 235,914 filed May 22, 1918, the latter being a division of application Serial Number 29,705, filed May 21, 1915, of which this application is a continuation.

What I claim is:

1. In combination, a casing, means for distributing material therein, means for causing a fluid current therein to traverse such material, means affording a precipitation chamber beyond said distributing means, means affording a current passage from said chamber, an extractor between said chamber and said passage for extracting floating material from the current flowing from said chamber to said passage and comprising a foraminous partition constituting a wall of said chamber, a fixed wall below the latter for said chamber, a second fixed wall below said extractor and affording a wall for said passage, said fixed walls spaced apart and affording between them a fine conduit for material precipitated by said extractor, and said fixed walls terminating at their upper edges below and affording a way above them for said current passage and a fine conduit between them out of the path of said current, means affording a coarse outlet below said distributor, and means affording a precipitate outlet below said chamber.

2. In combination, a casing, means for distributing material therein, means for causing a fluid current to traverse such material therein, means affording a precipitation chamber surrounding said distributing means for receiving such current, means affording a return current passage leading from said chamber, an extractor between said chamber and said passage for extracting floating material from the current flowing from said chamber comprising a foraminous partition constituting a wall of said chamber, a wall for said chamber below said extractor, a fixed wall spaced apart from said last mentioned wall, said last mentioned walls terminating at their upper edges below and affording above them a space for said passage and affording between them a fine conduit out of the path of said current for precipitate from said extractor, means affording a coarse outlet below said distributor, and means affording a precipitate outlet from said chamber.

3. In combination, a casing, means for distributing material therein, means for causing a fluid current to traverse material therein, means affording a precipitation chamber surrounding said distributor for receiving such current, means affording a return passage for current from said chamber, an extractor comprising a foraminous partition surrounding said return passage for extracting floating material from the current flowing from said chamber, annular means between said return passage and said distributor spaced apart from said casing having an upper open end affording a current passage to said chamber, a lower open end affording a current passage from said return passage and an intermediate part affording a wall for said return passage, a fixed wall below and inwardly of said extractor and below and spaced apart from said annular means, affording a lower wall for said return passage and an outlet for coarse material, a wall below said extractor spaced apart from said fixed wall having its upper edge below and affording a space above it for said return passage and affording below said extractor a conduit out of the path of said current for fine material intercepted by said extractor, and means affording an outlet from said precipitate chamber.

4 In combination, a casing, means for distributing material therein, means for causing a fluid current therein to traverse such material, a selector beyond said distributor, comprising upwardly and downwardly extending plates or members spaced apart to afford a current passage between them, means providing an outlet for material precipitated by said selector, means providing a dust chamber beyond said selector, an extractor beyond said dust chamber, means affording an outlet for material precipitated by said extractor separate from said chamber, and means affording conduits for causing such current to traverse successively said distributor, said selector, said chamber and said extractor.

5. In combination, a casing, means for distributing material therein, means for causing a fluid current to flow therein through such material, means affording a chamber beyond said distributing means, means affording a chamber beyond said chamber, means between said chambers for causing dust settling in the former chamber to flow in a wide thin stream through an intermediate part of the latter chamber, and means for causing said current to again traverse said material in the latter chamber.

6. In combination, a casing, means for distributing material therein, means for causing a current therein to flow through such material, means affording a dust chamber beyond said distributing means, means affording a second chamber below said chamber, means between said chambers receiving material from said first chamber and precipitating it into said second chamber intermediate of the walls thereof, and means affording a current passage communicating from said first chamber to said second chamber beyond said receiving means for causing current from said first chamber to flow into said second chamber beyond said precipitated material.

7. In combination, a casing enclosing a chamber, an upper receptacle supported within the chamber in spaced relation to said casing and having an open top and an open bottom, a lower receptacle supported within said casing below the upper receptacle and in spaced relation thereto and having its upper part spaced from the lower end of said upper receptacle and affording a return current passage between it and said upper receptacle, means to cause a fluid current to circulate through and around said upper receptacle and through the space between said receptacles, means within and adjustable vertically relatively to said lower receptacle to vary the space between said receptacles through which the current is permitted to circulate, and means for feeding material to be separated to said upper receptacle.

8. In combination, an outer casing enclosing a chamber, an upper receptacle supported within the chamber in spaced relation to said casing and having an open top and an open bottom, a fixed lower receptacle fixed below the upper receptacle and in spaced relation to said upper receptacle and affording a return current passage between said receptacles, an adjustable valve surrounding said upper receptacle and adjustable vertically downward inwardly of the outer edge of said lower receptacle for varying the space between said receptacles through which return current is permitted to circulate, and means for feeding material to be separated to said upper receptacle.

9. In combination, a casing enclosing a chamber, an upper receptacle supported within the chamber in spaced relation to said casing and having an open top and an open bottom, a lower receptacle supported below and having its upper end spaced from the lower end of the upper receptacle to afford a return current passage between them, an annular valve surrounding said upper receptacle within and adjustable downwardly toward said lower receptacle for varying the space between said receptacles through which return current is permitted to circulate, and means for feeding material to be separated to said upper receptacle.

10. In combination, a casing enclosing a chamber, an upper receptacle supported within the chamber in spaced relation to said casing and having an open top and an open bottom, a lower receptacle supported below and in spaced relation to said upper receptacle having an open upper end spaced from said upper receptacle to afford a passage for return current between them, a cylindrical valve within said lower receptacle and adjustable vertically to vary the space between said receptacles through which such current is permitted to circulate, and means for feeding material to be separated to said upper receptacle.

11. In combination, a casing, means for distributing material therein, means affording a chamber surrounding said distributing means, means affording a suction chamber communicating with said chamber, means affording an annular blast chamber, an annular perforate wall between said suction and blast chambers affording a bottom wall for the former and top wall for the latter, a tailings conduit affording a wall for said blast chamber, and means affording a tangential blast passage communicating with said chamber, and means affording a return conduit traversing said blast chamber axially.

12. In combination, an outer casing enclosing a chamber, an upper receptacle supported within the chamber in spaced relation to said casing and having an open top and an open bottom, a fixed lower receptacle supported below and in spaced relation to said upper receptacle to afford between them a return current passage and affording below the open bottom of said upper receptacle a tailings outlet for coarse material descending through said opening, a circular valve inwardly of and above said lower receptacle and adjustable vertically toward the latter to vary the space between said receptacles through which return current may flow. and means for feeding material to be separated to said upper receptacle.

13. In combination, an outer casing enclosing a chamber, an upper receptacle supported within the chamber in spaced relation to said casing and having an open top and an open bottom, a lower receptacle supported below and in spaced relation to said upper receptacle and affording between them a return current passage and affording below the open bottom of said upper receptacle an outlet for coarse material, an annular wall mounted in said chamber below said upper receptacle and extending downwardly therefrom and surrounding the space between said receptacles and affording an opening into said chamber exteriorly of said receptacles, means to cause a fluid current to circulate between said receptacles and through and around said upper receptacle and through said opening, a vertically adjustable valve above said lower receptacle within said annular wall for varying the space between said receptacles through which said current is permitted to circulate, and means for feeding material to be separated to said upper receptacle.

14. In combination, an outer casing enclosing a chamber, an upper receptacle supported within the chamber in spaced relation to said casing and having an open top and an open bottom, a lower receptacle supported below and in spaced relation to said upper receptacle and affording between them a return current passage and affording below said lower opening an outlet for coarse material, a foraminous wall surrounding said return current passage for extracting floating material from the current flowing thereto from said chamber, a valve adjustable relatively to said lower receptacle and disposed inwardly of said wall for varying the space through which current between said receptacles is permitted to flow, and means for feeding the material to be separated to said upper receptacle.

15. In combination, an outer casing enclosing a chamber, an upper receptacle supported within the chamber in spaced relation to said casing and having an open top and an open bottom, a lower receptacle supported below and in spaced relation to said upper receptacle and affording between them a return current passage and affording below said lower opening an outlet for coarse material, filtering means for extracting floating material from the return current surrounding said return passage below said upper receptacle and affording communication between said chamber and said return passage, means adjustable relatively to said lower receptacle and disposed inwardly of said filtering means for varying the space through which return current may pass to flow between said receptacles, means for causing a fluid current to flow through said upper receptacle and said passage, and means for feeding material to be separated to said upper receptacle.

16. In combination, an outer casing enclosing a chamber, an upper receptacle supported within the chamber and having an open top and a lower opening, a lower receptacle supported below and spaced apart from said upper receptacle and affording between them a return current passage and affording below said lower opening an outlet for coarse material, means for causing a fluid current to flow through said upper receptacle and return through said passage, an adjustable valve above said lower receptacle and surrounding the lower opening of said upper receptacle and adjustable vertically relatively to said receptacles to vary the space between them through which return current may flow, and means for feeding material to be separated to said upper receptacle.

17. In combination, a casing enclosing a distributing chamber, means for distributing material therein, means affording a chamber surrounding such chamber, means affording a return chamber communicating with said surrounding chamber and surrounding said distributing chamber, a tailings cone, means affording a tubular tailings conduit having an open end affording a return conduit surrounded by and extending exteriorly of said return chamber, means affording a pressure chamber surrounding and communicating with said tailings conduit, and means for withdrawing current from said return chamber and for introducing current to said pressure chamber.

18. In combination, a casing, means for distributing material therein, means for causing current therein to traverse such material, means affording a chamber surrounding said distributing means, a tapering lower wall for said chamber, a cylindrical wall below said tapering wall and recessed or cut away at one side, a second wall inwardly of said cylindrical wall and exposed at the cutaway portion thereof, means affording a return passage enclosed by said second wall, means affording a fine conduit intermediate of said walls, means affording a return chamber communicating with said return conduit, and means affording a tailings outlet below said return conduit.

19. In combination, a casing enclosing a chamber, an upper receptacle in spaced relation to said casing, and having an open top and a lower opening and a bottom conical wall, a downwardly outwardly inclined conical wall surrounding said lower opening below said conical wall, and affording a current outlet passage from said chamber, a tailings cone below and spaced apart from said lower opening and affording a current return passage below said outwardly inclined wall, a blower connected at its suction side to said outlet passage above and at its blast side to said return passage below said outwardly inclined wall, and means for feeding material to be separated to said receptacle.

20. In combination, a casing, means for distributing material therein, means for causing a current therein to flow through such material, means affording a chamber around said distributing means, means affording a tailings conduit leading from said casing, means affording a fines conduit leading from said chamber, and means affording a return conduit communicating with said chamber, said casing having recessed outer walls exposing the walls of said tailings conduit inwardly of said fines conduit.

21. In combination, a casing, means for distributing material therein, means for causing a current therein to flow through such material, means affording a chamber around said distributing means, means affording a chamber inwardly of said chamber, means affording a fine outlet for said first mentioned chamber, and a current exhausting means communicating with said first mentioned chamber, said casing having a portion affording access thereto.

22. In combination, a casing, means for distributing material therein, means for causing a current therein to flow through such material, and means affording a chamber surrounding said distributing means having a portion affording a plurality of outlet conduits spaced apart from one another and affording between them openings or spaces for access to the space inwardly of said chamber.

23. In combination, a casing, means for distributing material therein, means for causing a current therein to flow through such material, means affording a chamber surrounding said distributing means, and means affording a chamber inwardly of said first mentioned chamber, said casing having a bifurcated portion affording access to said second chamber.

24. In combination, a casing, means for distributing material therein, means for causing a current to flow therein, a chamber surrounding said means, means affording a tailings outlet below said distributor, means affording a return chamber below said chamber, a series of hollow sided extracting troughs between said chambers, means affording an annular conduit receiving the product from said troughs, means affording a separate conduit outwardly of and surrounding said conduit for the precipitate from said first mentioned chamber, and means affording a current conduit communicating with said return chamber inwardly of said annular conduit.

25. In combination, a casing, means for distributing material in a path therein, means for causing a fluid current to flow therein across said path, selecting means in the path of said current successive to said material path providing a horizontally extending sinuous current passage for receiving said current successive to said material path for extracting coarse particles carried by said current and affording a lower particle outlet beneath an intermediate portion of said sinuous passage for particles precipitated in said passage, a percipitation chamber within said casing successive to and receiving current from said sinuous passage, and means exposed without said casing affording a return current chamber for receiving said current successive to said precipitation chamber and returning such current to the other side of said path.

26. In combination, a casing, means for distributing material in a path therein, means for causing a fluid current to flow therein across said path, selecting means in the path of said current successive to said material path and affording a horizontally extending sinuous current passage successive to said material path for receiving said current successive to said material path for extracting coarse particles carried by said current, and providing a lower particle outlet for such particles below an intermediate portion of said sinuous passage, means within said casing affording a suction chamber surrounding said parts for receiving said current successive to said selecting means, means exposed without said casing affording a return chamber communicating between said suction chamber and the other side of said path, means affording a return conduit for said current, and a blower in communication with said return conduit and connected at its suction side with said suction chamber and at its discharge side with the other side of said path.

27. In combination, a casing, means for distributing material therein, means for causing a current to flow therein through said material, means affording an annular chamber surrounding said distributing means, a current chamber inwardly of and surrounded by said annular chamber, means affording a bottom wall for said annular chamber surrounding said current chamber and affording an opening or space for access to the latter inwardly of said annular chamber, and means affording a current conduit communicating between said chambers through said opening or space for returning such current from said annular chamber to said current chamber.

28. In combination, a casing affording an outer annular chamber, means for distributing material in said casing, means for causing a current to flow in said casing through such material, means affording a bottom wall for said outer chamber affording a recess or space below the latter for access beneath and inwardly of said outer chamber, a tailings cone below and inwardly of said annular chamber, projecting without said casing, and mounted in and exposed to access through said recess or space, and means affording a current conduit communicating between said outer chamber and said tailings cone for returning current from the former through the latter to said casing inwardly of said distributing means.

29. In combination, a casing enclosing a chamber, an upper receptacle within and in spaced relation to said casing having an open top and a lower opening, a lower receptacle exposed without said casing having an open top and spaced below said lower opening for receiving coarse material falling therefrom and affording a passage for return current from said chamber, means for causing a fluid current to flow through said upper receptacle into said chamber and return through said passage, and means for feeding material to said upper receptacle.

30. In combination, a casing enclosing a chamber, a receptacle in said casing having an upper opening in spaced relation to said chamber, means for feeding material to be separated to said receptacle, means for causing a fluid current to flow through said receptacle and into said chamber, means for returning said current to said receptacle, and detachably mounted means, at the under side of said receptacle and exposed without said chamber affording a lower wall for receiving coarse material and an outlet for the latter.

31. In combination, a casing enclosing a chamber and having a removable wall affording a closure for said casing and affording an outlet for coarse material from said chamber, a receptacle in said casing having an upper opening in spaced relation to said chamber and having a lower opening communicating with said coarse outlet, means for feeding material to be separated to said receptacle, means for causing a fluid current to flow through said receptacle into said chamber, and means enclosed by said removable wall affording a return conduit for causing current to return from said chamber to said receptacle through said lower opening.

32. In combination, a casing enclosing a chamber and having a removable tailings cone affording a closure therefor, a receptacle in said casing having an upper opening in spaced relation to said chamber and a lower opening in spaced relation to said cone, means for feeding material to be separated to said receptacle, means for causing a fluid current to flow through said receptacle and into said chamber, means affording an outlet for fine material from said chamber, and means for returning said current from said chamber to said receptacle through said lower opening.

33. In combination, a casing enclosing a chamber and having a removable outer wall affording an outlet for coarse material from said chamber, a receptacle in said casing having an upper opening communicating with said chamber and a lower opening communicating with said outlet, means for feeding material to said receptacle, means for causing a fluid current to flow through such material from said receptacle through said top opening to said chamber, and means for causing said current to return from said casing to said receptacle.

34. In combination, a casing enclosing a chamber and having a removable outer wall, a receptacle within and in spaced relation to said casing having an upper opening therein communicating with said chamber and having a lower material outlet, means for feeding material to said receptacle, means for causing a fluid current to flow from said receptacle through such material and such upper opening to said chamber, means inwardly of said outer wall for returning such current from said chamber to said receptacle, means without said removable outer wall affording a fine outlet from said casing, and means traversing said removable outer wall affording a coarse outlet from said casing.

35. In combination, a casing enclosing a chamber, means for distributing material within said chamber, means for causing a fluid current in said chamber to flow outwardly therein through such material to float fine material therein into the outer part of said chamber, and a tailings cone below said distributing means having an upper opening communicating with said chamber and a lower outlet affording a conduit for coarse material therefrom, said tailings cone exposed without and affording an outer wall for said casing.

36. In combination, a casing enclosing a chamber, means for distributing material to be separated therein, means for causing a fluid current therein to flow through such material to float fine particles to the outer part of said casing, and a removable tailings cone affording an outer wall for said chamber and a lower outlet for coarse material descending from said chamber.

37. In combination, a casing enclosing a chamber and having an open side, means for distributing material within said chamber, means for causing a fluid current in said chamber to float fine material to the outer part thereof, and means exposed through the open side of said casing affording an outlet for coarse material from said chamber.

38. In combination, a casing enclosing a chamber and having an open side, means for distributing material within said chamber, means for causing a fluid current in said chamber to float fine material to the outer part thereof, and means exposed through the open side of said casing affording a return current passage for such current.

39. In combination, a casing enclosing a chamber and having an open side, means for distributing material within said chamber, means for causing a fluid current in said chamber to float fine material to the outer part thereof, and means exposed through the open side of said casing affording a return current passage for such current and a tailings outlet for coarse material from such chamber.

40. In combination, a casing enclosing an annular outer precipitation chamber and having a removable outer bottom wall inwardly of said annular precipitation chamber, a receptacle within and in spaced relation to said casing having an upper opening communicating with said chamber and having a lower opening in spaced relation to said bottom wall, means for feeding material to be separated to said receptacle, means for causing a fluid current to flow through and around said receptacle and return between the latter and said bottom wall, and means for permitting coarse material descending from said receptacle to escape through said bottom wall.

In witness whereof, I have hereunto signed my name.

GEORGE HOLT FRASER.